Jan. 13, 1970 R. V. MOXLEY 3,489,466
ROLLING CAM TRACK
Filed Aug 13, 1968

RICHARD V. MOXLEY
INVENTOR
H. M. Saragovitz
BY E. J. Kelly
H. Berl
and M. V. Wallace
ATTORNEYS

United States Patent Office 3,489,466
Patented Jan. 13, 1970

1

3,489,466
ROLLING CAM TRACK
Richard V. Moxley, Hazel Park, Mich., assignor, by mesne assignments, to the United States of America as represented by the Secretary of the Army
Filed Aug. 13, 1968, Ser. No. 752,349
Int. Cl. B62d 55/20
U.S. Cl. 305—11                           2 Claims

ABSTRACT OF THE DISCLOSURE

An endless belt track for use in track laying vehicles, wherein a rolling cam link pin is used for joining the links of the track and wherein the two halves of the rolling cam pin are joined by a seal structure around the total periphery of the pin thereby providing protection for the rolling contact surfaces without the use of additional sealing means.

---

The field of the invention pertains to a track for track laying vehicles and more particularly to a track including the rolling cam link pin of the general type shown in Patent 1,975,107 to H. A. Knox et al. It is the present practice to insert the link pin of the rolling cam type into the link pin housing and provide seals for all the openings in the housing to protect the rolling cam surfaces. The large number of seals that are required in some link constructions increase the chance of a seal failure and increase the cost of the link structure.

The nature of the present invention is a new combination of link and rolling cam pin with seal for the purpose of improving the service life of the track by preventing contamination from reaching the rolling cam surfaces of the link pin and do so in a manner that is inexpensive. It has been discovered that the combination of the seal with the link pin will permit the link pin and the seal to be inserted into the link structure as one unit, thus eliminating the need for a multiplicity of seals for the openings to the link pin housing.

The above and other objects of the invention will appear more fully from the following more detailed description and from the drawing, wherein.

Figure 1:
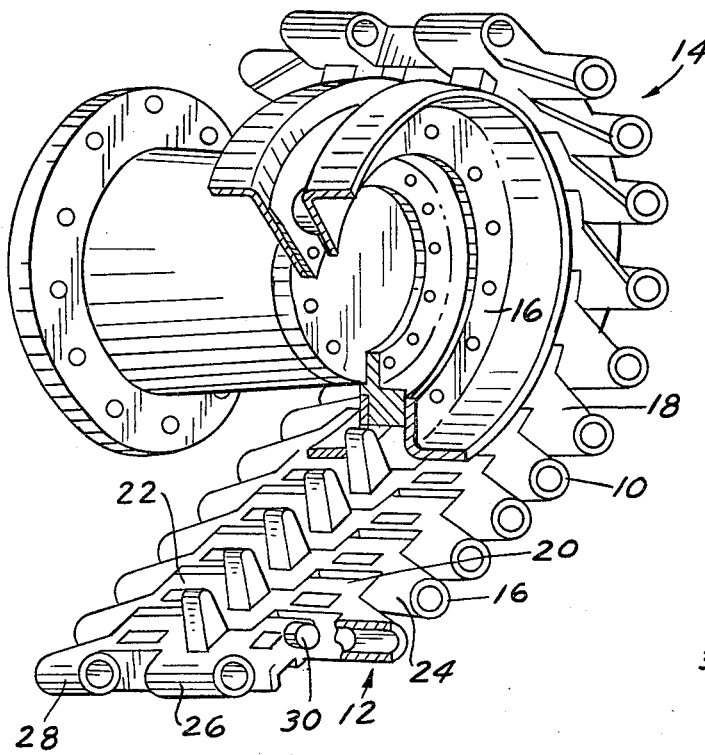
FIGURE 1 shows a portion of a track made of links and link pins of the instant invention.

Referring now to FIGURE 1, there is shown a portion of a track 10 as commonly used on tracked vehicles, wherein there is a straight section 12 passing under roadwheels, not shown, and a curved section 14 that passes around a drive sprocket 16. A plurality of identical links

2

Figure 2:
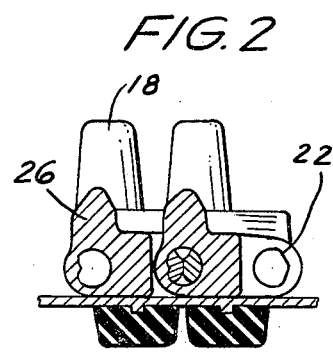
FIGURE 2 is a vertical cross section showing two links joined by the pin in a normal position.

18, FIGURE 2, are provided with forward projections 24, 26 and 28 adapted to interfit with each other and be joined by a rolling cam link pin 30.

Figure 3:
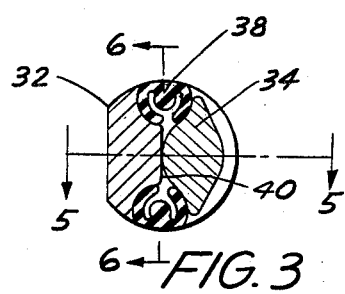
FIGURE 3 is a cross section of a link pin showing the seal with the pin in a normal position.
Figure 6:
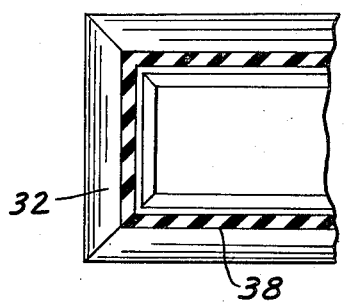
FIGURE 6 is a section taken substantially along line 6—6 of FIGURE 3.
Figure 4:
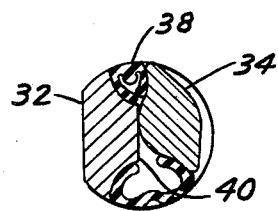
FIGURE 4 is a cross section of a link pin showing the seal when the pin is articulated from normal position.
Figure 5:
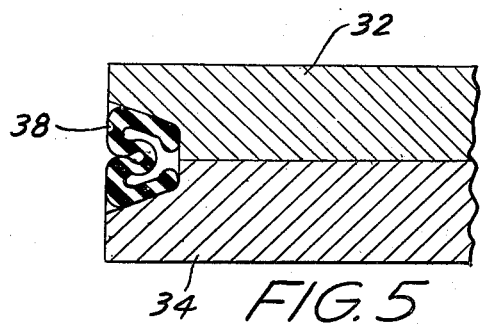
FIGURE 5 is a section taken substantially along line 5—5 of FIGURE 3.

Referring now to FIGURES 2, 3 and 4, the rolling cam link pin 30 is seen to include a base 32 and a cam 34, FIGURE 3. Base 32 is fixed within projections 24, 26, and 28 by any suitable means and cam 34 is likewise fixed within projections 28 and 22. A flexible wall 38 is secured to the base 32 and to the cam 34 by a suitable adhesive around the total periphery of both parts of the pin as shown in FIGURES 4 and 6 to completely seal off the contacting cam surfaces 40 from the outside environment. The flexible wall 38 permits articulation as shown in FIGURE 4 and helps to retain any necessary lubricant that is applied to the cam surface 40.

In assembling the pin with the links, the pin 30, comprised of the three parts, the base 32, cam 34, and seal 38 is inserted into the links by suitable means and base 32 and cam 34 are fixed in their respective positions and no further sealing means are required between the projections 20, 22, and the adjacent projections 24, 26 and 28 thus eliminating a difficult sealing problem at the opposed faces of these projections. Suitable end caps or plugs may be installed on the outer extremities of projections 24, 28.

The flexible wall 38 may be constructed of any suitable material such as rubber or the like having sufficient resistance to the effects of flexing, oxidation, lubricants, and other environmental conditions.

Having thus described my invention, it will be understood that there will be modifications to the same readily apparent to those skilled in the art.

I claim:
1. An endless track, comprising:
    a plurality of link members;
    a plurality of link pins each having a base part and a cam part connected to said link members for joining said link members end to end to form an endless track; and
    means connected to said base part and said cam part for enclosing and protecting the mutually contacting surfaces of the base part without interfering with the rocking motion between the two parts, the means for enclosing comprising a band of flexible material having an accordion pleat cross section.
2. The endless track of claim 1, wherein: the means for inclosing comprises a flexible material bonded to the base part on one edge and the cam part on the other edge.

References Cited

UNITED STATES PATENTS

| 1,356,958 | 10/1920 | Best _____ 305—59 |
| 1,975,107 | 10/1934 | Knox _____ 305—14 |
| 2,987,332 | 6/1961 | Bonmartini _____ 305—42 X |

RICHARD J. JOHNSON, Primary Examiner

U.S. Cl. X.R.
305—59